(12) United States Patent
Chang

(10) Patent No.: US 6,233,151 B1
(45) Date of Patent: May 15, 2001

(54) MOBILE RACK ADAPTER

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 0 days.

(21) Appl. No.: 09/449,859

(22) Filed: Nov. 29, 1999

(30) Foreign Application Priority Data

Nov. 11, 1999 (TW) .............................................. 088219262

(51) Int. Cl.$^7$ ........................................................ G06F 1/16
(52) U.S. Cl. .......................... 361/725; 361/683; 361/684; 361/686; 361/724; 361/726; 361/737; 361/741
(58) Field of Search .................................... 361/725, 727, 361/736, 737, 741, 683, 684

(56) References Cited

U.S. PATENT DOCUMENTS 5,786,984 * 7/1998 Bonardi et al. ...................... 361/686

\* cited by examiner

Primary Examiner—Leo P. Picard
Assistant Examiner—Yean-Hsi Chang
(74) Attorney, Agent, or Firm—Dougherty & Troxell

(57) ABSTRACT

A mobile rack adapter, which includes a box body, the box body having a back opening, a set of connection ports at a front side for connection to a computer and/or power supply, and a memory slot at the front side for receiving a mobile memory, a circuit board mounted inside the box body and connected to the connection ports, the circuit board having a memory circuit and a memory connector for communication with the mobile memory inserted into the memory slot, and an electric connector connected to the circuit board and extended out of the opening the box body for receiving a mobile rack for enabling the loaded mobile rack to be communicated with the computer being connected to the connection ports.

5 Claims, 3 Drawing Sheets

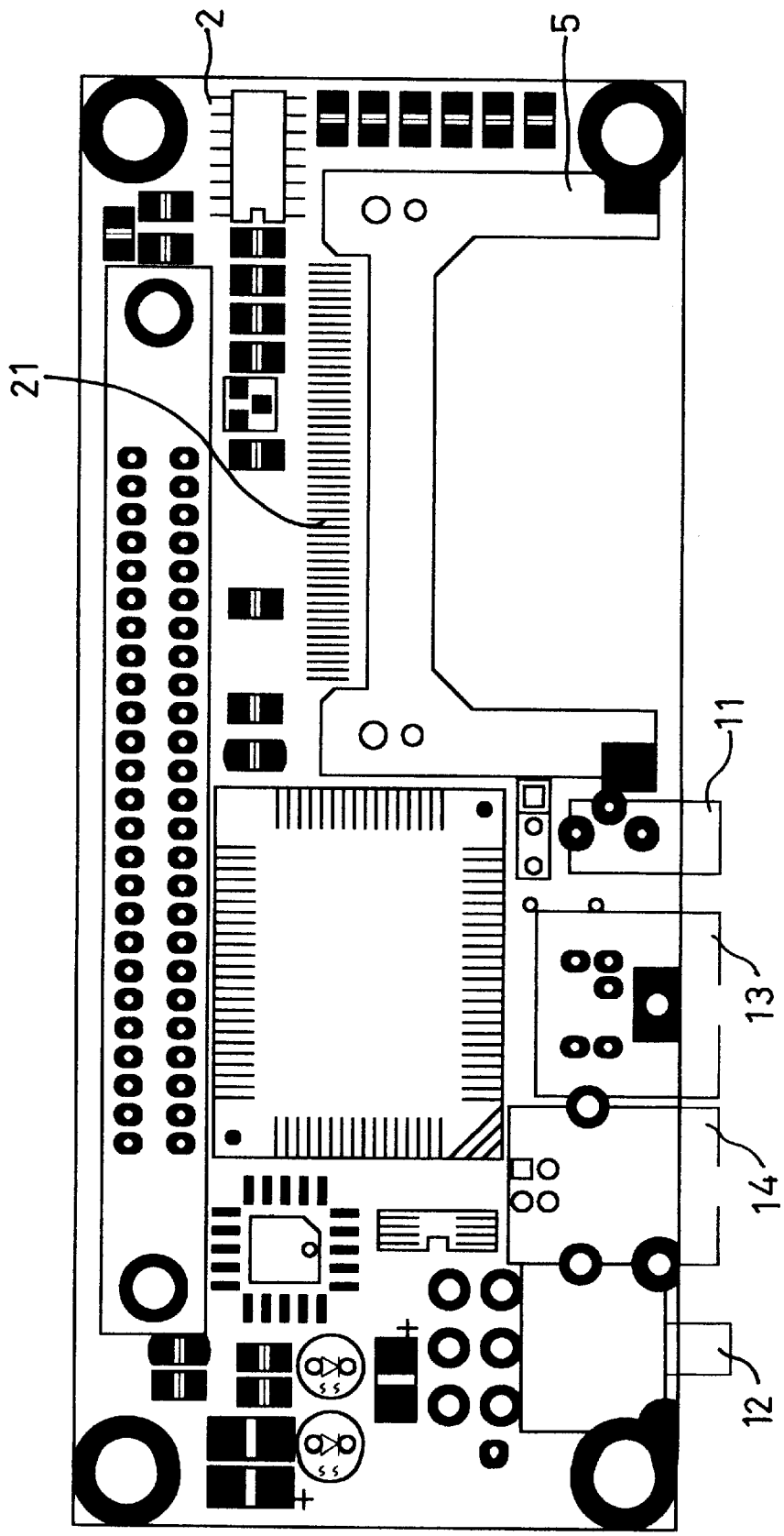

MOBILE RACK ADAPTER

BACKGROUND OF THE INVENTION

The present invention relates to a mobile rack adapter for connection to a mobile computer for receiving a mobile rack and a mobile memory.

A variety of mobile rack type computer peripheral apparatuses have been disclosed, and have appeared on the market. These mobile rack type computer peripheral apparatuses can be detachably installed in a computer. However, conventional mobile rack type computer peripheral apparatuses are designed for use with personal computers only, they cannot be used with a notebook computer. In recent years, USB (universal serial bus) technology has been well developed. By means of the application of USB, a mobile rack type computer peripheral apparatus can be connected to a notebook computer through mobile rack adapter means. U.S. patent application Ser. No. 08/995,748 disclosed a similar product. This mobile rack adapter comprises an electric connector at the back side for receiving a mobile rack, a USB port for connection to the USB of a computer, a power port for connection to a power supply, and selector switch means. This structure of mobile rack adapter simply connects a mobile rack to a personal computer. Further, digitized memory has been well developed nowadays. For example, MP3 memory and video camera memory are now commercially available. However, regular mobile rack adapters cannot receive a mobile memory.

SUMMARY OF THE INVENTION

It is the main object of the present invention to provide a mobile rack adapter for connecting a mobile rack to a personal computer, which has means to receive a mobile memory for communication with the personal computer linked thereto.

According to the present invention, the mobile rack adapter comprises a box body, the box body having a back opening, a set of connection ports at a front side for connection to a computer and/or power supply, and a memory slot at the front side for receiving a mobile memory, a circuit board mounted inside the box body and connected to the connection ports, the circuit board having a memory circuit and a memory connector for communication with the mobile memory inserted into the memory slot, and an electric connector connected to the circuit board and extended out of the opening the box body for receiving a mobile rack for enabling the loaded mobile rack to be communicated with the computer being connected to the connection ports.

BRIEF DESCRIPTION OF THE DRAWINGS

The present invention can be more fully understood by referring to the following description and accompanying drawings, in which:

FIG. 3 it a top plain view of a circuit board for a mobile rack adapter according to the present invention.

DETAILED DESCRIPTION OF THE PREFERRED EMBODIMENT

Figure 1:
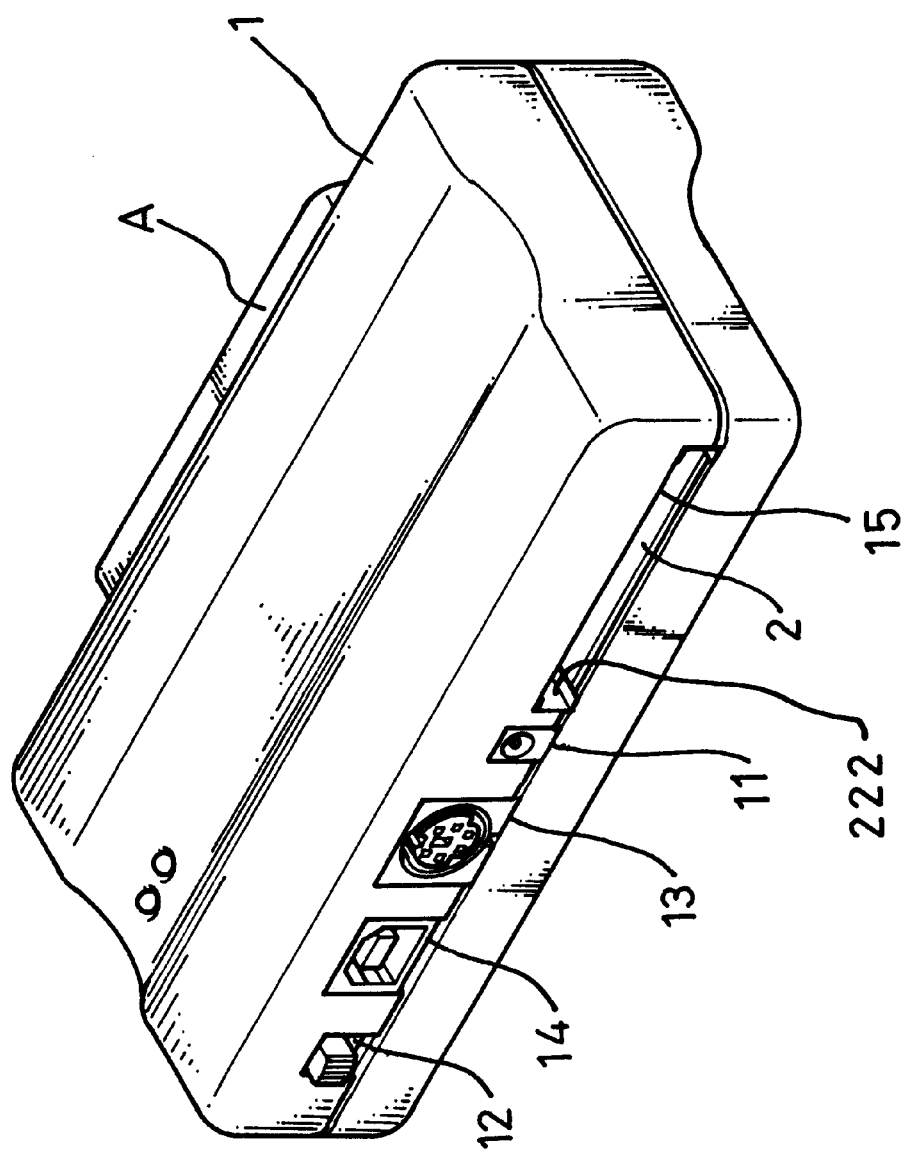
FIG. 1 is an elevational view of a mobile rack adapter according to the present invention.
Figure 2:
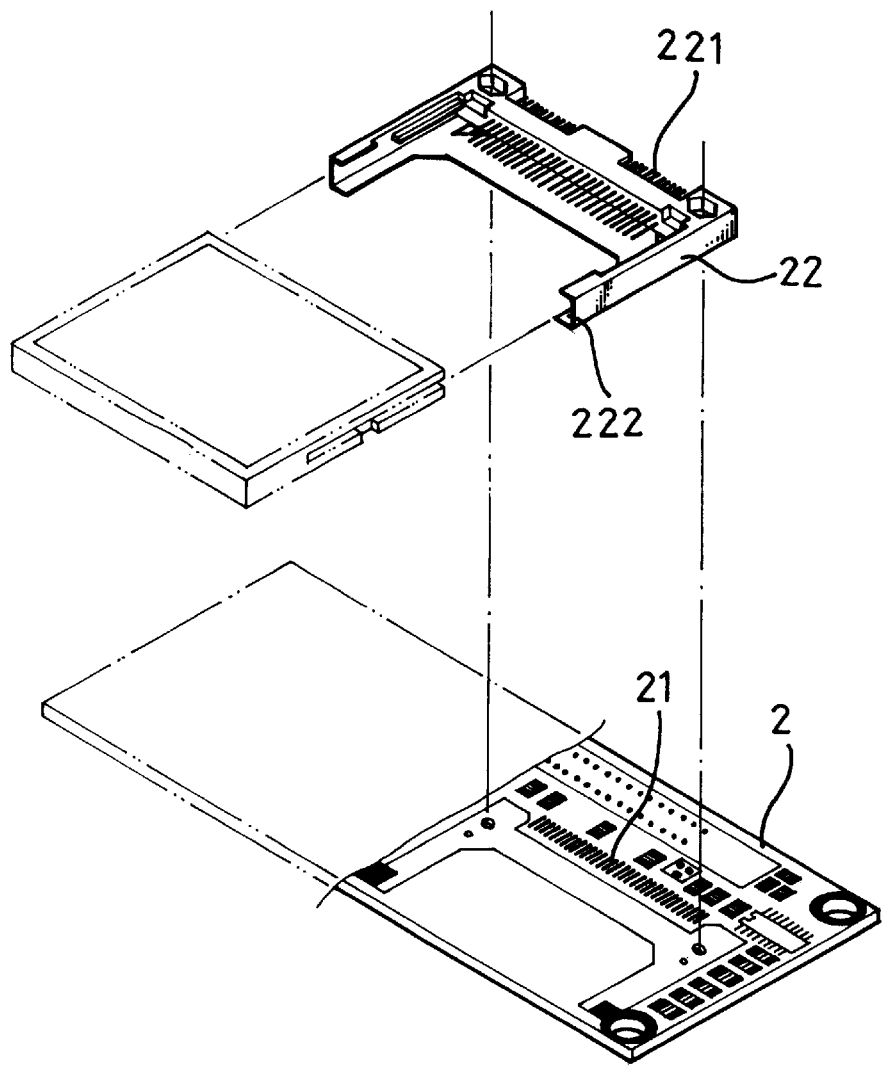
FIG. 2 is an exploded view of a circuit board and a memory connector for a mobile rack adapter according to the present invention.

Referring to Figures from 1 through 3, a mobile rack adapter box in accordance with the present invention is generally comprised of a box body 1, a circuit board 2 mounted in the box body 1, and an electric connector A connected to the circuit board 2 and extended out of the body 1 for receiving the electric connector of a mobile rack.

The box body 1 is a hollow shell holding and protecting the circuit board 2, comprising an opening (not shown) at the back side thereof through which the circuit board 2 extends to the outside of the box body 1. At the front side of the box body 1, there are provided a single-power power port 11, a power selector switch 12, a dual-power power port 13, a USB (universal series bus) 14, and a memory slot 15.

The circuit board 2 is mounted inside the box body 1 and connected to the electric connector A and the single-power power port 11, power selector switch 12, dual-power power port 13 and USB (universal series bus) port 14 at the box body 1, comprising a memory circuit 21 and a memory connector 22. The memory connector 22 is suspended in the memory slot 15 in the box body 1 for receiving a mobile memory. The memory connector 22 comprises two parallel sliding grooves 222 defined within the frame bases thereof for the positioning of a mobile memory, and a set of contact pins 221 mounted in the frame base and respectively connected to the memory circuit 21 for communication with the USB connected to the USB port 14.

When in use, the electric connector A is connected to a mobile rack, the USB port 14 is connected to the USB of a computer, and the first power port 11 or second power port 13 is connected to power supply, enabling the mobile rack to communicate with the computer. Further, a mobile memory may be inserted into the memory slot and positioned in the memory connector 22, enabling the computer to access data in the mobile memory.

While only one embodiment of the present invention has been shown and described, it will be understood that various modifications and changes could be made thereunto without departing from the spirit and scope of the invention disclosed.

What the invention claimed is:

1. A mobile rack adapter comprising:
   a box body, said box body comprising:
      an opening at one side of said box body,
      a plurality of connection ports at a side of said box body opposite from said one side for connection to a computer and/or power supply, said connection ports including a single-power power port, a dual-power power port, a power selector switch, and a universal series bus port, and
      a memory slot for receiving a mobile memory;
   a circuit board mounted inside said box body and connected to said connection ports, said circuit board comprising a memory circuit for communication with the mobile memory inserted into said memory slot; and
   an electric connector connected to said circuit board and extended out of the opening at said box body for receiving a mobile rack for enabling the loaded mobile rack to be communicated with the computer being connected to said connection ports.

2. The mobile rack adapter of claim 1 wherein said circuit board comprises a memory connector, said memory connector comprising a frame base suspended in said memory slot for receiving a mobile memory, and a set of contact pins mounted in said frame base for enabling the loaded mobile memory to be electrically connected to said memory circuit.

3. The mobile rack adapter of claim 1 wherein said memory slot and said connection ports are disposed at the same side at said box body.

4. The mobile rack adapter of claim 2 wherein said frame of said memory connector comprises two parallel sliding grooves for guiding the loaded mobile memory into connection with said contact pins.

5. The mobile rack adapter of claim 1 wherein said mobile memory is a read-write memory.

* * * * *